United States Patent
Schmidt et al.

(10) Patent No.: US 9,719,174 B2
(45) Date of Patent: Aug. 1, 2017

(54) ARTICLE HAVING COMPOSITE COATING

(75) Inventors: Wayde R. Schmidt, Pomfret Center, CT (US); Paul Sheedy, Vernon, CT (US); William Werkheiser, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 867 days.

(21) Appl. No.: 12/824,569

(22) Filed: Jun. 28, 2010

(65) Prior Publication Data
US 2011/0318549 A1 Dec. 29, 2011

(51) Int. Cl.
| | |
|---|---|
| B32B 15/00 | (2006.01) |
| B32B 17/00 | (2006.01) |
| C23C 28/00 | (2006.01) |
| C04B 41/00 | (2006.01) |
| C04B 41/45 | (2006.01) |
| C04B 41/52 | (2006.01) |
| C04B 41/87 | (2006.01) |
| C04B 41/89 | (2006.01) |
| F01D 5/28 | (2006.01) |
| C23C 28/04 | (2006.01) |

(52) U.S. Cl.
CPC ............ *C23C 28/00* (2013.01); *C04B 41/009* (2013.01); *C04B 41/455* (2013.01); *C04B 41/52* (2013.01); *C04B 41/87* (2013.01); *C04B 41/89* (2013.01); *C23C 28/042* (2013.01); *C23C 28/322* (2013.01); *C23C 28/34* (2013.01); *C23C 28/3455* (2013.01); *F01D 5/288* (2013.01); *F05D 2230/31* (2013.01); *F05D 2230/90* (2013.01); *F05D 2300/603* (2013.01); *F05D 2300/611* (2013.01); *Y10T 428/24851* (2015.01); *Y10T 428/24893* (2015.01); *Y10T 428/24909* (2015.01)

(58) Field of Classification Search
CPC .................................................... C23C 28/042
USPC .......................................................... 428/210
See application file for complete search history.

(56) References Cited

U.S. PATENT DOCUMENTS

| | | | | |
|---|---|---|---|---|
| 4,420,352 A | * | 12/1983 | Schroeder et al. | ........ 156/89.27 |
| 5,079,195 A | | 1/1992 | Chiang et al. | |
| 5,098,740 A | * | 3/1992 | Tewari | .......................... 427/215 |
| 5,196,059 A | | 3/1993 | Niebylski | |
| 5,258,229 A | | 11/1993 | Lum et al. | |

(Continued)

FOREIGN PATENT DOCUMENTS

| | | |
|---|---|---|
| EP | 0412516 | 2/1991 |
| JP | 5-251088 | 9/1993 |
| WO | 2007089666 | 8/2007 |

OTHER PUBLICATIONS

Czubarow, "Application of poly(methylsilane) and Nicalon polycarbosilane precursors as binders for metal/ceramic powders in preparation of functionally graded materials," Journal of Materials Science, 32, 1997, p. 2121-2122.*

(Continued)

*Primary Examiner* — Ian Rummel
(74) *Attorney, Agent, or Firm* — Carlson, Gaskey & Olds, P.C.

(57) ABSTRACT

A composite article includes a substrate and a powder-derived composite coating on the substrate. The composite coating includes discrete regions of a first material and discrete regions of a second material. At least one of the first material or the second material is a chemical precursor.

17 Claims, 1 Drawing Sheet

(56) References Cited

U.S. PATENT DOCUMENTS

| | | | | |
|---|---|---|---|---|
| 5,272,239 | A | * | 12/1993 | Jensen .............................. 528/9 |
| 5,332,701 | A | | 7/1994 | Bryson et al. |
| 5,585,428 | A | * | 12/1996 | Quinn et al. ................. 524/400 |
| 5,635,250 | A | * | 6/1997 | Blum et al. .................. 427/387 |
| 5,843,526 | A | | 12/1998 | Lukacs, III |
| 6,165,551 | A | * | 12/2000 | Lukacs et al. ................ 427/228 |
| 6,627,126 | B2 | | 9/2003 | Schmidt et al. |
| 6,699,450 | B2 | * | 3/2004 | Dunn et al. ................... 423/291 |
| 6,820,334 | B2 | | 11/2004 | Kebbede et al. |
| 7,374,825 | B2 | * | 5/2008 | Hazel et al. .................. 428/632 |
| 2003/0195122 | A1 | | 10/2003 | Demendi |
| 2005/0012233 | A1 | | 1/2005 | Kim |
| 2005/0100756 | A1 | * | 5/2005 | Langan et al. ............... 428/617 |
| 2006/0280952 | A1 | * | 12/2006 | Hazel et al. .................. 428/446 |
| 2007/0292690 | A1 | | 12/2007 | Schmidt |
| 2008/0226879 | A1 | * | 9/2008 | Strock et al. ............. 428/195.1 |
| 2008/0233422 | A1 | * | 9/2008 | Kodas et al. ................ 428/570 |
| 2009/0130446 | A1 | | 5/2009 | Schmidt |
| 2010/0129673 | A1 | | 5/2010 | Lee |

OTHER PUBLICATIONS

Davis, "Handbook of Thermal Spray Technology," 2004.*
"Aggregation Behavior of Alkoxide-Derived Silica in Sol-Gel Process in Presence of Poly(ethylene oxide)," Takahashi et al., Journal of Sol-Gel Science and Technology 17, 7-18, 2000.*
EP Search Report dated Aug. 13, 2012.
European Search Report for European Patent Application No. 11171808 completed Nov. 19, 2015.

* cited by examiner

… (1)

ARTICLE HAVING COMPOSITE COATING

BACKGROUND

This disclosure relates to protective coatings. Ceramic and metallic materials, such as superalloys, are attractive materials for use in articles that operate under severe environmental conditions. As an example, gas turbine engine components are subjected to high temperatures, corrosive and oxidative conditions, and elevated stress levels. In order to improve the thermal and oxidative stability of these components, various types of coatings have been used to protect the article from the elevated temperature conditions or corrosive/oxidative and stress-producing environments. Likewise, many other types of components or articles may also utilize protective coatings.

SUMMARY

An example composite article includes a substrate and a powder-derived composite coating on the substrate. The composite coating includes discrete regions of a first material and discrete regions of a second material. At least one of the first material or the second material is a chemical precursor.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
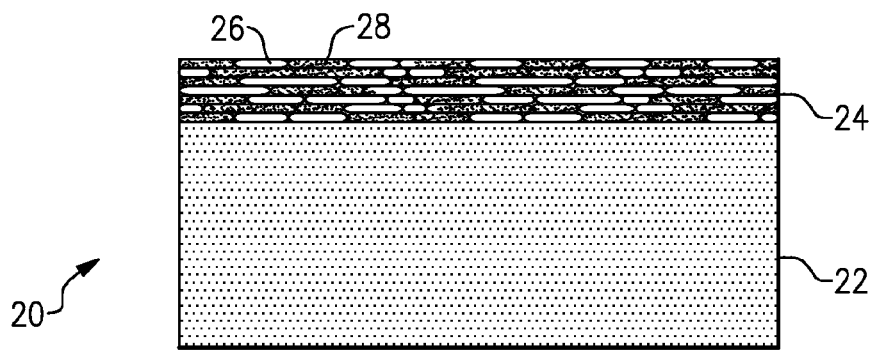
FIG. 1 illustrates an example composite article that includes a composite coating.

FIG. 1 illustrates an example composite article 20 that may be fabricated from a composite powder, as described for example in co-pending application Ser. No. 12/824,642, entitled COMPOSITE POWDERS, and co-pending application Ser. No. 12/824,736, entitled METHOD FOR FABRICATING COMPOSITE POWDERS.

In the illustrated example, the composite article 20 includes a substrate 22 and a solid, powder-derived composite coating 24 (hereafter "composite coating 24") disposed on the substrate 22. Generally, the composite coating 24 is a thin layer of substantially uniform thickness on the substrate 22. In this case, the composite coating 24 adjoins, or is in direct contact with, the surface of the substrate 22. As will be described below, the composite coating 24 may alternatively be deposited onto other layers that are on the substrate 22. The composite coating 24 may be used as a barrier coating, such as in an aerospace component, a friction or abradable coating, a joining or bonding layer, or other type of protective or functional coating.

The composite coating 24 includes discrete, elongated regions 26 of a first material and discrete, elongated regions 28 of a second material. In some examples, the discrete regions 26 and 28 derive from the composite powder that is used to form the composite coating 24. At least one of the first material or the second material is a chemical precursor to a third, different material. A chemical precursor may be a compound or substance that is capable of chemically reacting or converting into another, chemically different material. That is, the chemical precursor is capable of fully or substantially fully converting to another material. The chemical precursor may even be a partially converted chemical precursor, such as the product of reaction between a chemical precursor with the other materials in the composite coating 24.

The chemical precursor may be selected from metallic salts, organometallic compounds, sol-gel precursors, preceramic polymers, partially converted preceramic polymers, oligomeric materials, free carbon, or combinations thereof. The metallic salt ororganometallic material may later be reduced, such as in a thermal process, to convert the salt or organometallic material to a third material, such as a metal. Similarly, the sol-gel, preceramic polymer, oligomeric material or carbon may be reacted or converted (at least partially), such as in a thermal process, to produce a ceramic-containing material. In this regard, the composite article 20 may be considered to be an intermediate article until the chemical precursor is fully or substantially fully converted.

The chemical precursors are not limited to any particular type or kind and may be selected based on the desired properties of the composite coating 20. However, for aerospace components, chemical precursors to metals, metal-containing compounds, such as intermetallics, and ceramic-containing phases may be desired. In some examples, the metal salt may be a nitrate, acetate, carbonate, halide or combination thereof. For instance, the metal salt may be aluminum nitrate, yttrium nitrate, zirconyl nitrate, aluminum acetate, zirconium acetate, magnesium carbonate, yttrium carbonate, cobalt chloride, or nickel chloride.

In some examples of the organometallic material, the organometallic material may be an acetylacetonate, octanoate, oxalate, stearate, hydroxide or alkoxide, such as nickel acetylacetonate, nickel octanoate, nickel oxalate, nickel stearate, copper hydroxide, or silicon alkoxide. The chemical precursor may also include combinations of these organometallic materials.

In some examples of preceramic polymers, the preceramic polymer may be polycarbosiloxane, which converts into a silicon-containing ceramic material. In general, the preceramic polymer may be one that thermally converts into a silicon-containing ceramic material, such as silicon carbide, silicon oxycarbide, silicon oxynitride, silicon-containing glass, other silicon-containing oxide, carbide, nitride, boride, or combination, including composite and heteroatomic phases.

As described, at least one of the first material or the second material is a chemical precursor. However, in some examples, the other of the first material or the second material may also be a chemical precursor (e.g., as described above) or a ceramic material.

In the "as deposited" state, the second material of the composite coating 24 may be a chemical precursor that is in metallic form. The metal of the second material may be silicon, aluminum, molybdenum, boron, nickel, zirconium, hafnium, titanium, vanadium, niobium, tantalum, tungsten, rhenium, ruthenium, iridium, cobalt, copper, chromium, iron, alloyed metal or combinations thereof, but generally may be selected from metalloids, transition metals and rare earth metals. The metal may later be reacted with other constituents within the composite coating 24 to form a ceramic material, such as a carbide, oxide, nitride, boride, silicide, oxycarbide, oxynitride, carbonitride, aluminide, silicate, titanate, phosphate, phosphide or combination thereof of the above-listed metals, metalloids, transition metals or rare earth metal(s).

In one example, the first material is a precursor-derived material that includes a silicon-containing ceramic material and free carbon (i.e., a chemical precursor). The free carbon may be a byproduct of conversion of the precursor to ceramic. The composite article 20 may thereby be further processed to react the free carbon with the metal, such as a refractory metal, of the second material to form a carbide or other desired compound as the discrete regions 28 in the composite coating 24. Refractory metals may include titanium, zirconium, hafnium, vanadium, niobium, tantalum, chromium, molybdenum, tungsten, rhenium, ruthenium, osmium, rhodium, iridium, and combinations thereof.

The volume percentage of the discrete regions 26 of the first material relative to the combined volume of the discrete regions 26 of the first material and the discrete regions 28 of the second material may be 5%-95%, with the remainder being the second material. In some instances, the discrete regions 26 may be the chemical precursor and comprise more than 50 vol % of the composite coating 24.

The substrate 22 may be any suitable material, depending upon the end use application. For instance, the substrate 22 may be a ceramic material, such as a monolithic ceramic or a ceramic matrix composite, a metal or alloy, such as a superalloy, or a glass or glass matrix composite. The ceramic material may include carbide, oxide, nitride, boride, silicide, oxycarbide, oxynitride, carbonitride, aluminide, silicate, titanate, phosphate and phosphide materials. The ceramic matrix composite may include an oxide matrix, a silicon carbide matrix, a silicon nitride matrix, a silicon carbonitride matrix and other ceramic matrices, such as a polymer impregnated/pyrolysis-derived ceramic matrix composite. The metal substrates may be nickel, cobalt, iron, titanium or their alloys. The glass matrix composite may include a silicate-based matrix.

The composite coating 24 may be deposited in a desirable thickness for the end use application. As an example, the thickness may be in the range of only a few micrometers up to several millimeters. One advantage of using the composite powders to fabricate the composite coating 24 is that liquid, semi-solid, or solid chemical precursors can be used and made into composite powders to enable deposition of the composite coating 24 in greater thicknesses than are available by directly processing the coating from liquid precursors. For instance, the thicknesses available by using liquid precursors are limited by the volume changes and cracking that occurs during conversion of the precursor into the ceramic material. However, by incorporating the chemical precursor into a composite powder and using the powder to deposit the composite coating 24, it is possible to deposit the composite coating 24 in greater thicknesses without the same concern for cracking.

Figure 2:
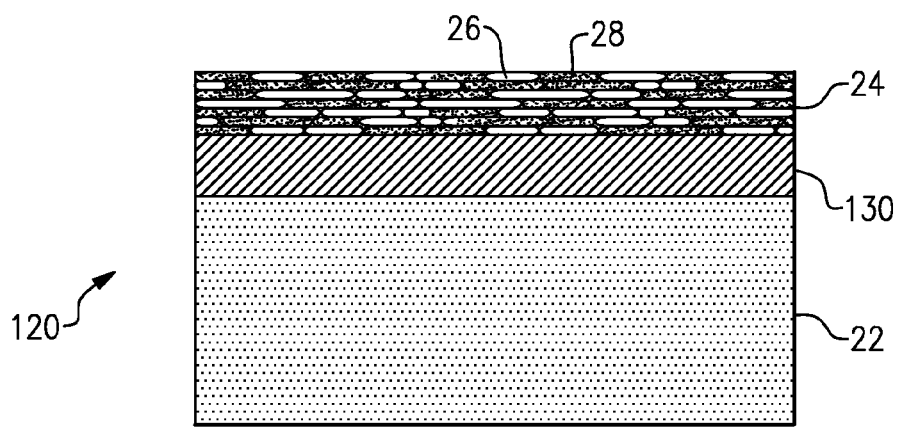
FIG. 2 illustrates another example composite article that includes a bond layer between a composite coating and a substrate.

FIG. 2 illustrates another example composite article 120 that also includes the composite coating 24. In this disclosure, like reference numerals designate like elements where appropriate, and reference numerals with the addition of one-hundred or multiples thereof designate modified elements that are understood to incorporate the same features and benefits of the corresponding original elements. In this case, the composite article 120 additionally includes a bond layer 130 between the composite coating 24 and the substrate 22. The bond layer 130 facilitates strong bonding between the composite coating 24 and the substrate 22.

The bond layer 130 may be a metallic material, intermetallic material, glass material, ceramic material, or combinations thereof. For instance, the bond layer may be silicon, a refractory metal, a combination of silicon and refractory metal or metals, or a combination of refractory metals. The composition of the bond layer 130 may be tailored to the composition of the composite coating 24. For instance, the bond layer 130 and the discrete regions 28 may have a nominally equivalent composition of metallic material, intermetallic material, glass material, or ceramic material.

Figure 3:
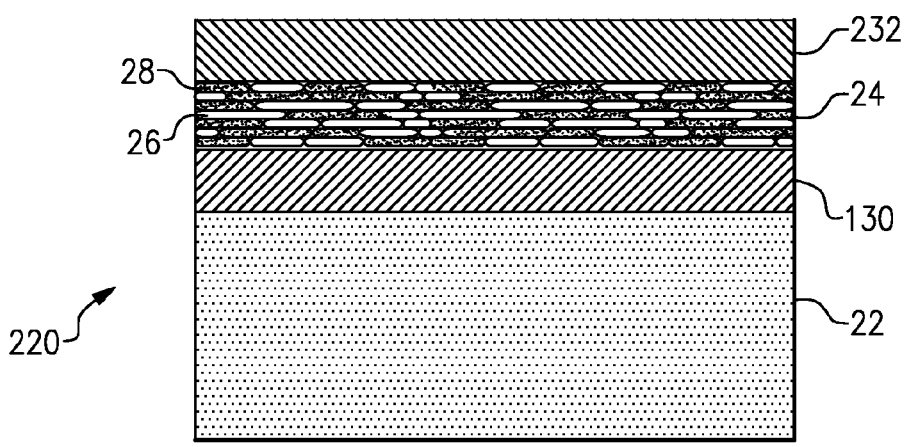
FIG. 3 illustrates another example composite article that includes a bond layer between a composite coating and a substrate, and a topcoat on the composite coating.

FIG. 3 illustrates another example composite article 220 that is somewhat similar to the example shown in FIG. 2. In this case, the composite article 220 additionally includes a ceramic topcoat 232 that is disposed on the composite coating 24. The ceramic topcoat 232 adjoins the composite coating 24, although in other examples other layers may be deposited between the ceramic topcoat 232 and the composite coating 24. The composite coating 24, optional bond layer 130, and topcoat 232 may together form an environmental barrier coating system for protecting the underlying substrate 22. As an example, the topcoat 232 may be a ceramic material that functions as a barrier layer, and has the same or different composition as the first or second materials in the composite coating 24.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
   a substrate; and
   a fully powder-derived composite coating disposed on the substrate and including discrete, elongated regions of a first material and discrete, elongated regions of a second material, and at least one of the first material or the second material is a chemical precursor, wherein the first material is the chemical precursor and is selected from a group consisting of sol-gel precursor material, oligomeric material and combinations thereof, and the second material is a metal selected from a group consisting of cobalt, copper and combinations thereof.

2. The composite article as recited in claim 1, wherein the chemical precursor is a material selected from a group consisting of nickel acetylacetonate, nickel octanoate, nickel oxalate, nickel stearate, silicon alkoxide, and combinations thereof.

3. The composite article as recited in claim 1, wherein the first material is the chemical precursor and is present in an amount that is greater than an amount of the second material.

4. The composite article as recited in claim 1, further comprising a bond layer between the substrate and the powder-derived composite coating.

5. The composite article as recited in claim 4, wherein the bond layer is selected from a group consisting of a metallic material, intermetallic material, glass material, ceramic material, and combinations thereof.

6. The composite article as recited in claim 4, wherein the bond layer is selected from a group consisting of silicon metal, refractory metal, and combinations thereof.

7. The composite article as recited in claim 1, further comprising a topcoat on the powder-derived composite coating.

8. The composite article as recited in claim 1, wherein the substrate is a ceramic material.

9. The composite article as recited in claim 8, wherein the ceramic material is a ceramic matrix composite comprising a silicon carbide matrix.

10. The composite article as recited in claim 1, wherein the substrate is selected from a group consisting of glass and glass matrix composites.

11. The composite article as recited in claim 1, wherein the first material is the oligomeric material.

12. The composite article as recited in claim 1, wherein the first material is the sol-gel precursor material.

13. The composite article as recited in claim 1, wherein the second material is the cobalt.

14. The composite article as recited in claim 1, wherein the second material is the copper.

15. A composite article comprising:
   a substrate; and
   a fully powder-derived composite coating disposed on the substrate and including discrete, elongated regions of a first material and discrete, elongated regions of a second material, and at least one of the first material or the second material is a chemical precursor, wherein the chemical precursor is a material selected from the group consisting of nickel acetylacetonate, nickel octanoate, nickel oxalate, nickel stearate, silicon alkoxide, and combinations thereof.

16. The composite article as recited in claim 15, wherein the material is selected from the group consisting of nickel acetylacetonate, nickel octanoate, nickel oxalate, nickel stearate and combinations thereof.

17. The composite article as recited in claim 15, wherein the material is the silicon alkoxide.

* * * * *